United States Patent
Vandanapu

(10) Patent No.: US 8,290,984 B2
(45) Date of Patent: Oct. 16, 2012

(54) CONFIGURATION DEPLOYMENT MANAGEMENT

(75) Inventor: Eswar Vandanapu, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 961 days.

(21) Appl. No.: 12/255,085

(22) Filed: Oct. 21, 2008

(65) Prior Publication Data

US 2010/0100870 A1 Apr. 22, 2010

(51) Int. Cl.
*G06F 9/44* (2006.01)
*G06F 17/30* (2006.01)

(52) U.S. Cl. .......................... 707/796; 717/172

(58) Field of Classification Search ............ 717/162, 717/167, 172, 177; 707/796
See application file for complete search history.

(56) References Cited

U.S. PATENT DOCUMENTS

| | | | | |
|---|---|---|---|---|
| 6,487,713 | B1* | 11/2002 | Cohen et al. | 717/105 |
| 7,150,015 | B2* | 12/2006 | Pace et al. | 717/176 |
| 7,428,723 | B2* | 9/2008 | Greene et al. | 717/103 |
| 2003/0182307 | A1* | 9/2003 | Chen et al. | 707/103 X |
| 2003/0192027 | A1* | 10/2003 | Porter | 717/100 |
| 2004/0031030 | A1* | 2/2004 | Kidder et al. | 717/172 |
| 2007/0156736 | A1* | 7/2007 | Bestgen et al. | 707/101 |
| 2008/0201705 | A1* | 8/2008 | Wookey | 717/175 |
| 2008/0276231 | A1* | 11/2008 | Huang et al. | 717/145 |

* cited by examiner

*Primary Examiner* — Jorge A Casanova
(74) *Attorney, Agent, or Firm* — Kilpatrick Townsend & Stockton LLP

(57) ABSTRACT

Applications, code modules, and other such software objects are able to be deployed and/or ported even when the corresponding configuration data is spread between a relational database management system (RDBMS) database and a meta data services (MDS) database, even where the configuration data is spread across any disparate databases. Configuration data also can be stored in a custom repository, such as a custom extensible markup language (XML) file. One approach involves detecting foreign keys, creating logical references to replace the foreign keys, and resolving the foreign keys to new references in the deployed environment by using the logical references. Code can be stored in the databases in order to help resolve the foreign keys.

15 Claims, 7 Drawing Sheets

CONFIGURATION DEPLOYMENT MANAGEMENT

BACKGROUND OF THE INVENTION

Generally, the present application is directed to the deployment of computer software, and various embodiments relate more specifically to the deployment of application software modules in which the configuration is described in different types of databases.

Computer software in general is a collection of source code and/or libraries which is compilable or interpretable to be read and executed as instructions to a machine. It can also include machine-readable instructions specifying the results that a section of source code should produce. For example, computer software can include extensible markup language (XML) that defines how a file of hypertext markup language (HTML) should lay out a web page.

Computer software can be compiled or grouped into a software application, which is commonly called a computer program. An information technology (IT) solution can involve multiple stores and software applications. The IT solution's data can be spread between files, glue code, directories, databases, and other systems. Porting an IT solution, or merely its subcomponent software applications, from a test computing environment into the real-world production environment can result in broken links if the ported code points to references in the test environment which are not exactly duplicated in the production environment.

A link is a reference from one portion of source code to another portion of source code, or from one portion of source code to an area where data is stored. A link can also associate data in one part of a database with data in another database. When the source code is managed in a database, a link from one item to another item in the database is often called a key. If the key points to an item in a database external to its own database, then the key is sometimes called a foreign key.

Companies which use large IT solutions spend money and resources to create a change control policy so that software applications on the test system are deployed to the production system with few, if any, broken links. Often, all of the tested configuration is migrated into the production system as opposed to just a few pieces of it, in order to reduce the risk of disruption. In the case of complex applications, months can be spent just testing the configuration to be moved by repeatedly installing it on a setup similar to the production system until all of the broken links can be found.

To alleviate the problem of broken links, the configuration of software applications, including where the links point, can be stored in databases, along with the software code itself. Software developers have used such source code databases in order to help them port a software application from a test environment to a production environment, but there is a need in many cases for greater flexibility when deploying software applications.

BRIEF SUMMARY OF THE INVENTION

This application is directed to systems and methods for deploying a software application which has its configuration data stored in different types of configuration databases. In one such software application, one part of the code in one database links to another part of the code in a different database using a foreign key. A method in accordance with one embodiment detects the foreign key, constructs a logical reference in place of the foreign key, scans the deployed environment for the most similar reference, and resolves the link by setting the new foreign key to point to that most similar reference.

A method in accordance with one embodiment involves exporting, to an exportable format, a software application having two or more different types of configuration repositories describing a single configuration of the software application. The method includes detecting a foreign key in a first configuration item in a first repository, the foreign key pointing to a second configuration item in a second repository, where the first and second repositories are of different repository types. The method also includes creating a logical reference using the foreign key, the logical reference being associated with the first configuration item and referencing an indeterminate configuration item of the same type as the second configuration item, copying the first repository to an exportable format of the software application, and storing the logical reference with the exportable format so that the logical reference can be used to resolve the foreign key in the first configuration item to a third configuration item in a third repository in a deployed environment, the second and third repositories being of the same type.

Another method in accordance with one embodiment includes deploying a software application having at least two disparate configuration repositories, where the software application is deployed from an initial computer environment to a deployed computer environment. The software application in the initial environment includes a first repository having a first configuration item, and a second repository having a second configuration item, where the first and second repositories are of different types. The first configuration item includes a foreign key which points to the second configuration item and the first and second repositories are associated with the software application. The software application in the deployed environment includes a third repository having a third configuration item, where the first and third repositories are of different types. The method generally includes detecting the foreign key in the first configuration item, creating a logical reference which points to the second configuration item using the detection of the foreign key, copying the first repository from the initial environment to the deployed environment; and resolving the foreign key in the first configuration item using the logical reference so that the foreign key points to the third configuration item. After the method is performed, the first repository can be used in the deployed environment, and the first and third repositories are associated with the software application which is deployed.

Another embodiment of the invention is a machine-readable medium embodying information indicative of instructions for causing one or more machines to perform operations for one or more of the above methods.

Yet another embodiment of the invention is a system for porting program code having at least two types of configuration repositories describing a single configuration of the program code, the system including a processor and memory device with instructions to perform one or more of the above methods.

DETAILED DESCRIPTION OF THE INVENTION

Figure 1A:
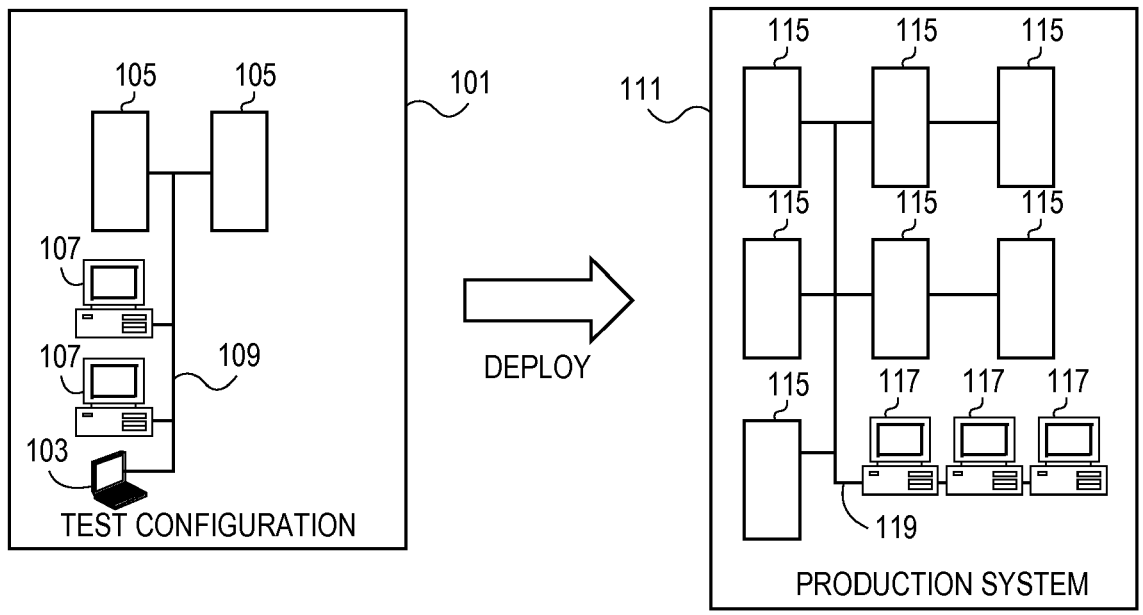
FIG. 1A is a diagram of computer hardware in both a test configuration and a production system which can be used with an embodiment of the present invention.

As illustrated in FIG. 1A, a system in accordance with one embodiment can be used to deploy software from one computer environment, usually a "test configuration," to another computer environment, usually a "production system." A test configuration refers in general to any combination of hardware and/or software components in at least one test environment 101. The hardware in one embodiment includes development machines 103, a set of computer servers 105, workstations and personal computers (PC) 107, and network devices and cabling 109. A production system refers in general to any combination of hardware and/or software components in at least one production environment 111. The hardware typically includes a larger set of components, such as a larger number of computer servers 115, workstations and PCs 117, and/or network cabling and devices 119.

Each network can be a local-area network (LAN) or a wide area network (WAN) such as the Internet or the World Wide Web. The computing devices can be connected to the network through a variety of connections including standard telephone lines, LAN or WAN links (e.g., T1, T3, 56 kb, X.25), broadband connections (ISDN, Frame Relay, ATM), or wireless connections. Connections can be established using a variety of communications protocols (e.g., TCP/IP, IPX, SPX, NetBIOS, Ethernet, RS232, or direct asynchronous connections).

Figure 1B:
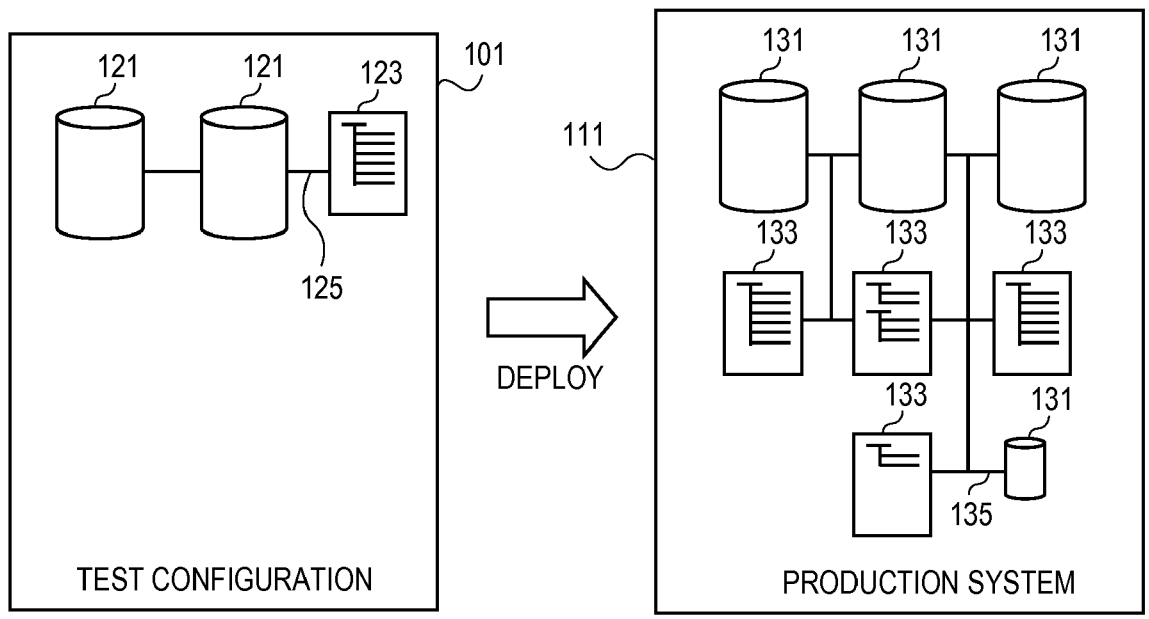
FIG. 1B is a representative diagram of directories, files, and databases which are stored on and used by the computer hardware of FIG. 1A.

FIG. 1B illustrates directories, files, and databases which can be stored on the hardware illustrated in FIG. 1A. In test environment 101, the software typically includes databases 121 and files 123 which are connected by network 125. Likewise, in production environment 111, the software typically includes a larger number of databases 131 and files 133 which are connected by network 135.

The directories, files, and databases can organize and store a software application which is to be deployed from test configuration 101 to production system 111. Configuration parameters are stored along with the software application.

Figure 2:
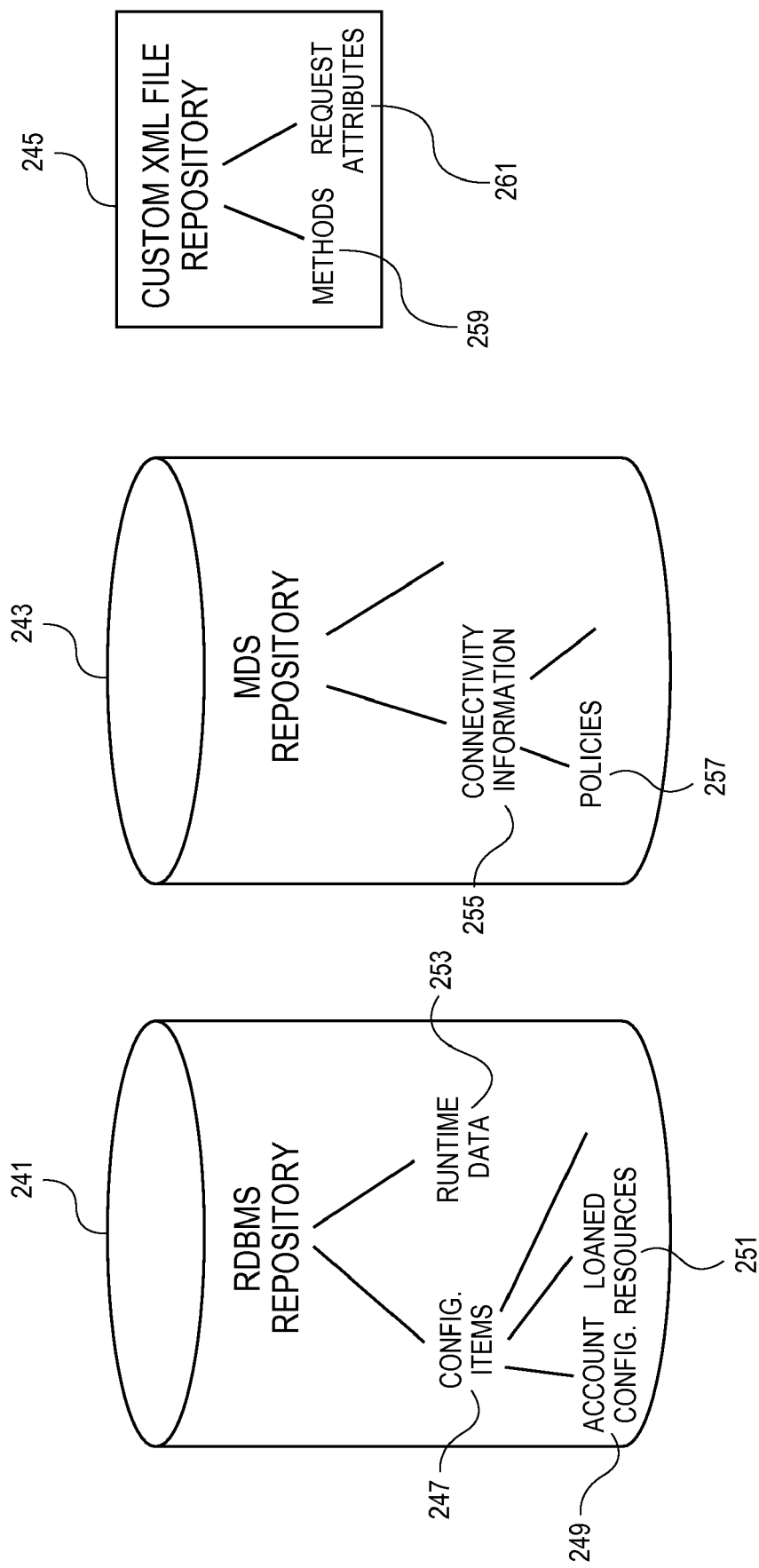
FIG. 2 is a diagram of software repositories that can be used with an embodiment of the present invention.

FIG. 2 illustrates three disparate, or different types of, repositories which can be used in test and production environments such as those described with respect to FIGS. 1A and 1B. The term "disparate" is used interchangeably with the phrase "different types of." In one example, one repository is a relational database management system (RDBMS) repository 241. Another repository is a meta data services (MDS) repository 243. A third type of repository is a custom XML file repository 245. A custom repository can use XML or any other organization technique to store and manage data.

Repositories 241, 243, and 245 can be stored in test environment 101 and production environment 111 on servers 105 and 115 on databases 121 and 131 or files 123 and 133.

Although RDBMS repository 241, MDS repository 243, and custom XML file repository 245 may be considered different 'database models' from one another, different database models are not required for repositories to be considered different repository types. Specifically, a different database type does not require that a database be a different model. For example, a custom XML file may employ a relational model like an RDBMS database and therefore be classified as a relational database; however, the custom XML file is considered a different type of repository than an RDBMS database. Similarly, an RDBMS database may in fact use XML in its underlying code; however, the RDBMS database is a different type of repository than a custom XML file.

Entries in a database are sometimes called "items," which are akin to rows in a database of tables, such as a relational database. An item can also refer to an organized portion of data within a file or other storage mechanism besides a database. A "configuration item" is an item which stores information about the configuration of a software application.

In FIG. 2, RDBMS repository 241 stores configuration items 247 such as account configuration items 249 and loaned resource configuration items 251. RDBMS repository 241 can also store runtime data 253. MDS repository 243 can store connectivity information 255, such as policies 257. Custom XML file repository 245 can store methods 259 and request attributes 261. Any of the repositories can store the various types of data; however, the exemplary embodiment is preferred.

Figure 3:
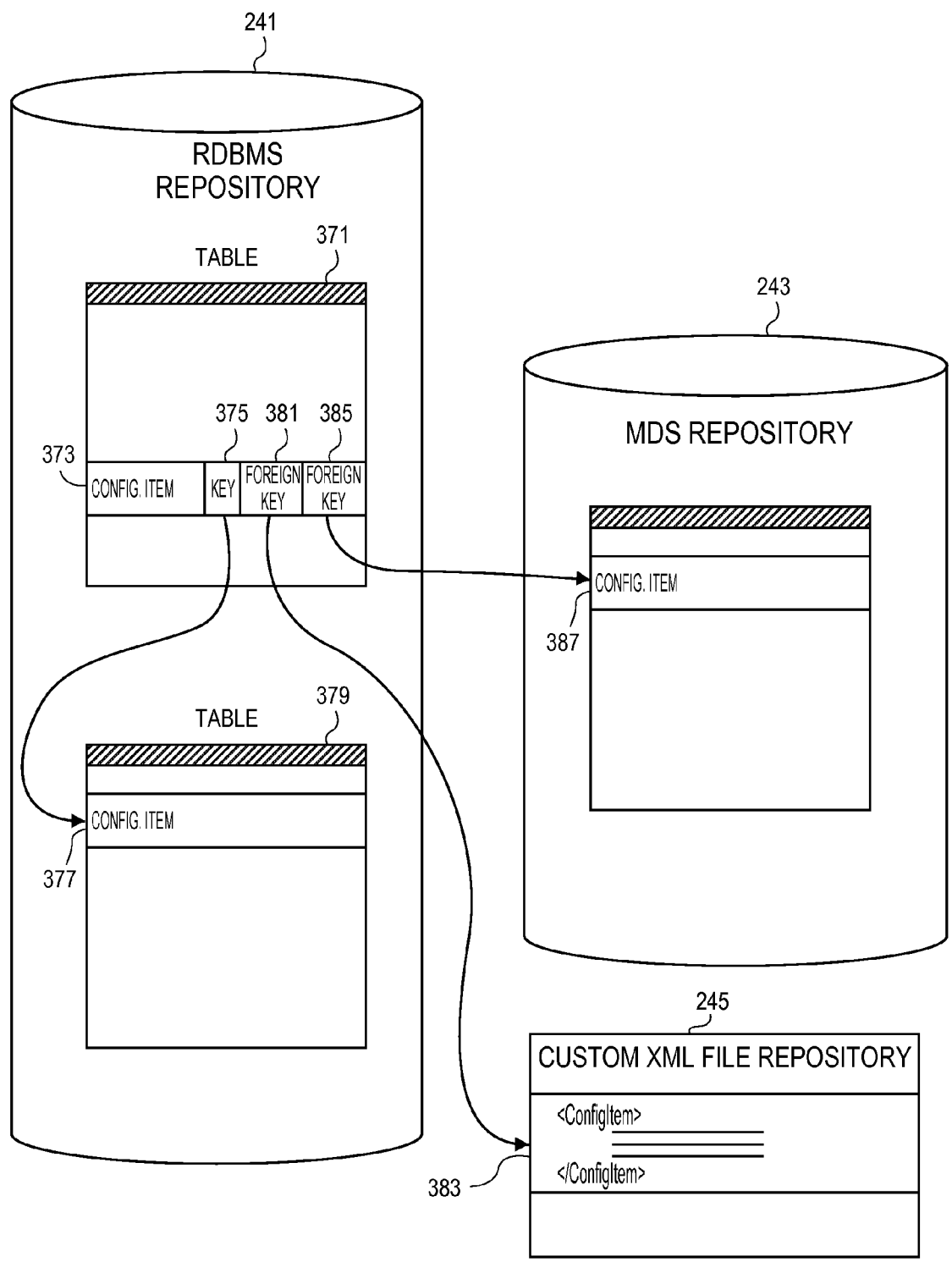
FIG. 3 is a diagram of interconnected software repositories that can be used with an embodiment of the present invention.

FIG. 3 illustrates RDBMS repository 241 storing table 371 in which configuration item 373 resides. Item 373 includes a key 375, which links to configuration item 377 in another table 379 within the same RDBMS repository 241. Because key 375 links to an item within the same database, it can be called a local key.

The term "links to" is used interchangeably with similar terms such as "points to." For example, key 375 is a link, which points to configuration item 377. Because key 375 is part of configuration item 373, it can also be said that configuration item 373 points to configuration item 377.

A key points to a particular item or sub-item within a database or file. A key can be replaced with a logical reference so it no longer points anywhere but instead holds a placeholder or stub so that the key can be re-referenced to a similar item or sub-item.

Item 373 also includes a foreign key 381 which points to configuration item 383 in custom XML file repository 245. Because key 381 links to an item outside its own database, it can be called a foreign key.

Item 373 also includes a foreign key 385 which points to configuration item 387 in MDS repository 243. Because key 385 points to an item outside its own database, it can also be called a foreign key.

A configuration item can hold several keys, as shown in configuration time 373, which holds keys 375, 381, and 385. Alternatively, a configuration item can hold only one key, either local or foreign. A configuration item may also have zero keys such that it only stores data.

A configuration item which is pointed to may also point back. For example, configuration item 387 could include a foreign key (not shown) that links back to an item in RDBMS repository 241. Such a link can point to another table within RDBMS repository 241, or even link back to the same table 371 as originating link 385. It is cautioned that such a link might cause a circular dependency error if the link points to configuration item 373 which holds the originating link. More commonly, multiple links can extend back and forth between different items in the disparate repositories, effectively cross-linking the databases.

Figure 4:
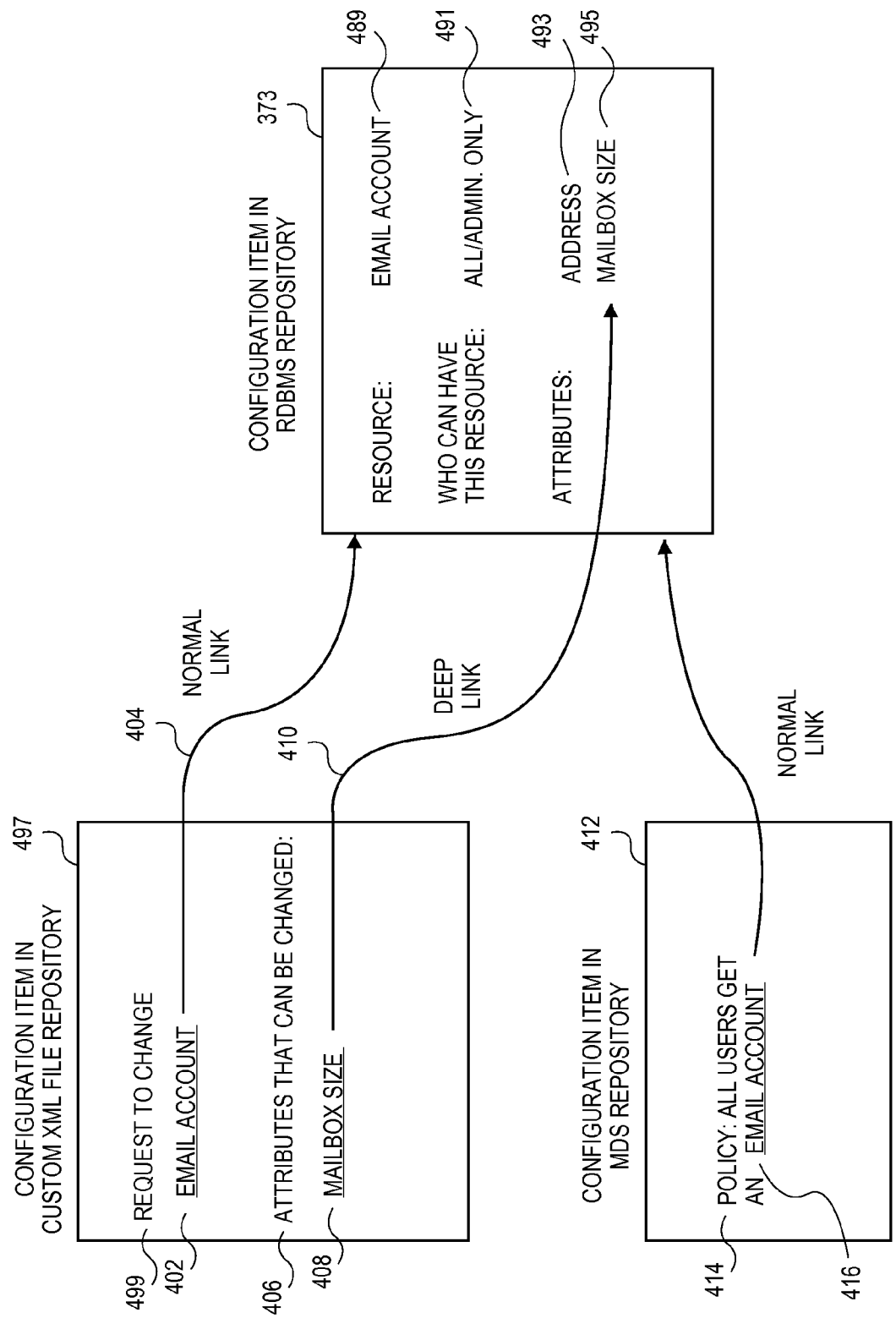
FIG. 4. is a diagram of configuration items that can be used in an embodiment of the present invention.

FIG. 4 illustrates links from a disparate repository pointing to configuration item 373. Configuration item 373 defines a resource 489, in this case an email account. Associated with resource 489 is an instruction on who can have access to the resource, the instruction in field 491, in this case either all employees or administrative employees only. Also associated with resource 489 are attributes, the first attribute 493 being the email account's email address and the second attribute 495 being the email account's mailbox size.

Configuration item 497 in a custom XML file repository includes a request to change 499 instruction which is associated with configuration item 373 by key 402, so that configuration item 497 is a request to change an email address. Key 402 points to configuration item 373, and can also be represented by link 404. Configuration item 497 also defines which attributes can be changed by request to change 499. One such attribute 406 is associated with second attribute 495 (mailbox size) within configuration item 373 by key 408. Thus, the attribute that can be changed by request to change 499 is mailbox size 495. Key 408 points to second attribute 495 within configuration item 373, and can also be represented by link 410. Because link 410 points to a field within an item, it is sometimes called a "deep link." In contrast, link 404 described above, which points to an overall item, is sometimes called a "normal link."

Configuration item 412 in an MDS repository has a policy 414 which determines what all users get, which is associated with configuration item 373 by key 416, so that configuration item 412 is a policy that all users get an email account.

An advantage of various embodiments is that custom repositories can be used for configuration information. That is, conventional systems required configuration information to be in a standardized database in order for the application to be easily deployed. Systems and methods in accordance with various embodiments, however, do not require configuration information to be in a standardized format. This allows a company to use custom XML files best suited for the company's business to store configuration information for its software applications which manage resources.

Another such advantage is that foreign links to a disparate database are allowed to exist in configuration items. That is, a configuration item may contain a link to an external, different type of database. This allows a company to keep configuration data in the type of database most efficient for its needs.

Systems and methods in accordance with various embodiments provide for the deployment of a software application from one environment, such as test environment 101, to another environment, such as production environment 111. The software application has at least two different types of configuration repositories describing a single configuration of the code, such as configuration repositories RDBMS repository 241 and MDS repository 243.

As described with respect to FIGS. 1-4, the example software application in test environment 101 includes configuration repository 241 having configuration item 373. The application also includes configuration repository 243 having configuration item 387. Configuration repository 241 and 243 are disparate, or different types of, repositories. Configuration item 373 has foreign key 385 which points to configuration item 387.

Figure 7A:
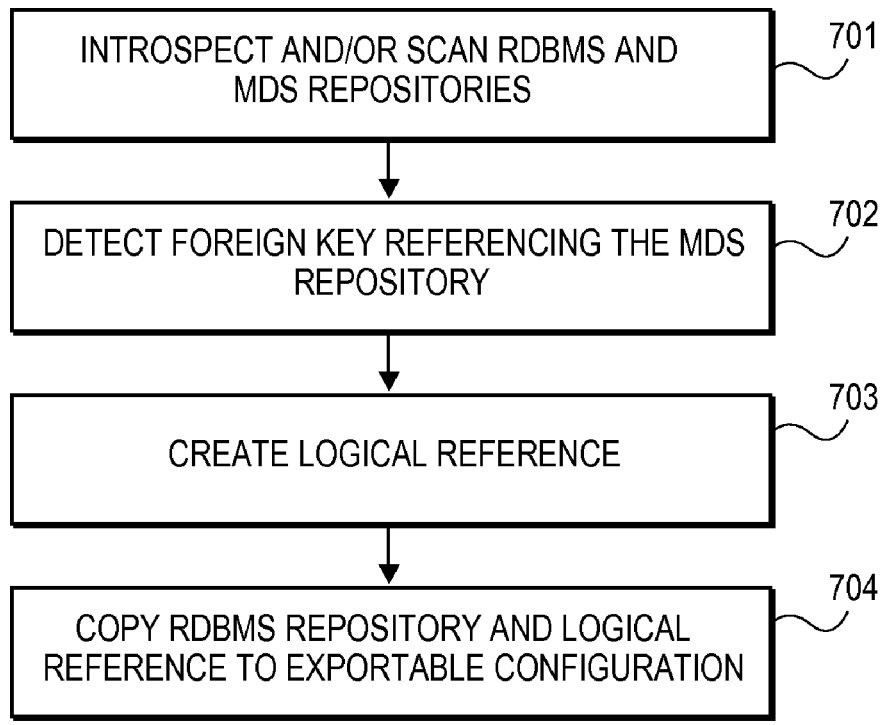
FIG. 7A is a flowchart depicting a method in accordance with an embodiment of the present invention.

With reference to FIGS. 3 and 7A, an export utility can introspect and/or scan repositories 241 and 243 in phase 701 and detect foreign key 385 in phase 702. In phase 703, a logical reference (not shown) or other such element can be created to point to configuration item 387, or more preferably point to a yet-to-be-determined or indeterminate configuration item of the same data type. In phase 704, configuration repository 241 and the logical references can be copied to an exportable format of the software application, such as to a compact disk (CD), floppy disk, flash drive, or other portable media, or a .cab, .zip, .tar, or other distribution file or set of such files.

A map file can be created in which logical references are stored. As each logical reference is created, the logical reference can be saved up updated into the map file. The map file may be copied to the exportable format with the software application, or it may be stored separately. The map file itself may store the logical references in XML or any other suitable organizational scheme.

Figure 7B:
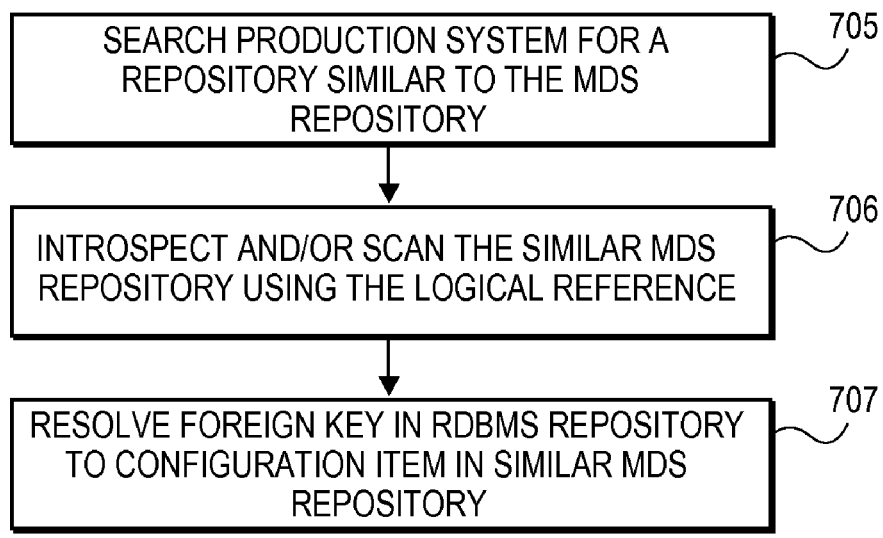
FIG. 7B is a flowchart depicting further processes in a method in accordance with an embodiment of the present invention.

With reference to FIGS. 3 and 7B, an import utility in this embodiment searches production system 111 for a configuration repository similar to repository 243 in phase 705. A similar configuration repository will generally be of the same type as that of repository 243. When a similar repository is found, the utility can introspect and/or scan the repository in phase 706 using the logical reference, to find a similar configuration item to 387 within the similar configuration repository. Configuration repository 241, which has been copied from the disk to the production environment, can then be linked to the new, disparate configuration repository in phase 707. That is, foreign key 385 is resolved using the logical reference. In this way, configuration repository 241 can be used in the deployed environment. Configuration repository 241 and the similar configuration repository are now associated with the software application.

Introspection in one embodiment involves scanning each column header or field name of each table of a relational database. If one or more field names in another table matches those of the first table, then the tables can be marked as "similar." For example, if two tables share the field names of "Last Name," "First Name," and "Address," then the tables can be assessed as similar. Similarity may depend on other factors, such what percentage of the field names in a table are the same, or whether the field names are exact matches.

Figure 5:
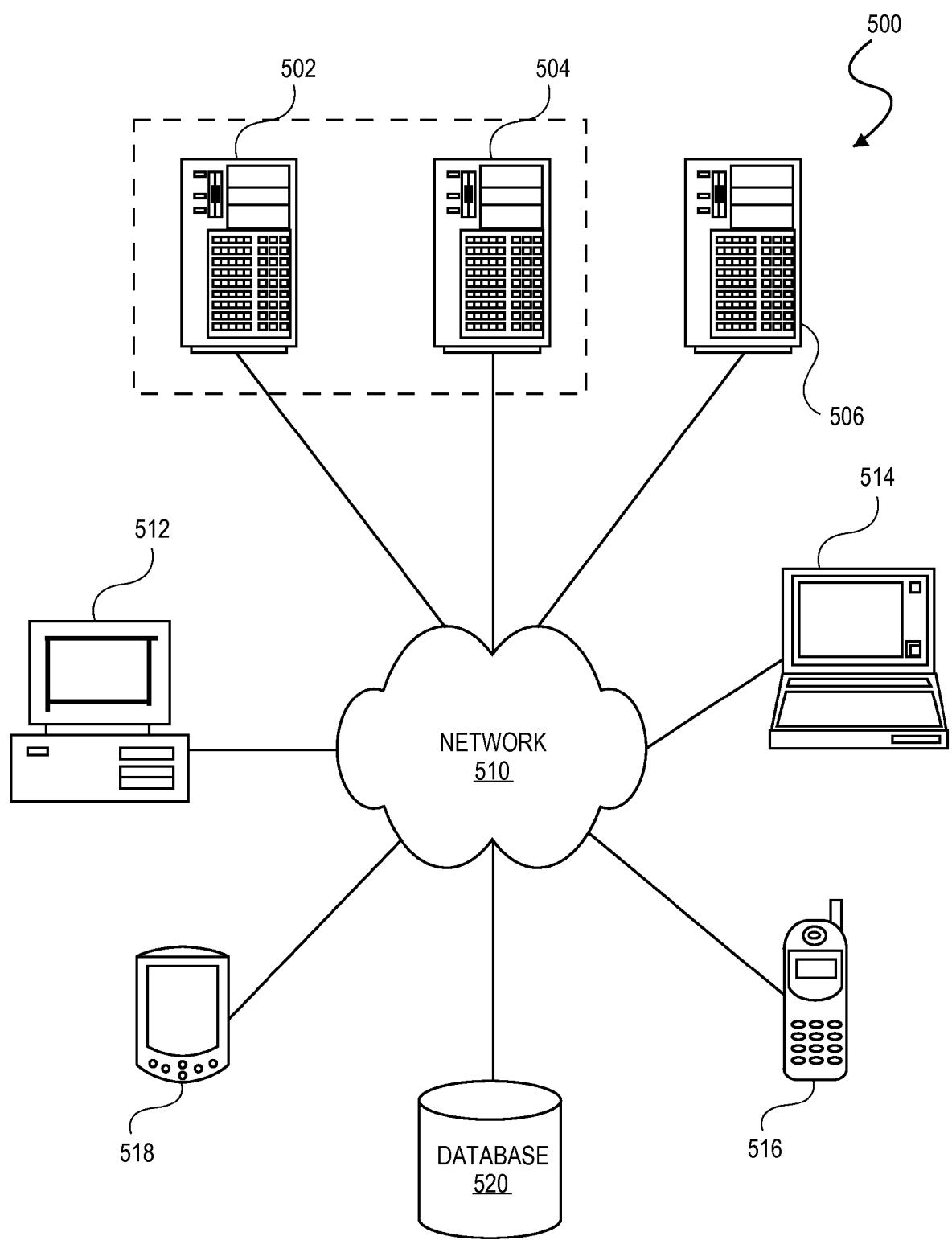
FIG. 5 illustrates components of a computer network that can be used in accordance with one embodiment.

FIG. 5 is a block diagram illustrating components of an exemplary operating environment in which various embodiments of the present invention may be implemented. The system 500 can include one or more user computers, computing devices, or processing devices 512, 514, 516, 518, which can be used to operate a client, such as a dedicated application, web browser, etc. The user computers 512, 514, 516, 518 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 512, 514, 516, 518 may also have any of a variety of applications, including one or more development systems, database client and/or server applications, and Web browser applications. Alternatively, the user computers 512, 514, 516, 518 may be any other electronic device, such as a thin-client computer, Internet-enabled gaming system, and/or personal messaging device, capable of communicating via a network (e.g., the network 510 described below) and/or displaying and navigating Web pages or other types of electronic documents. Although the exemplary system 500 is shown with four user computers, any number of user computers may be supported.

In most embodiments, the system 500 includes some type of network 510. The network may can be any type of network familiar to those skilled in the art that can support data communications using any of a variety of commercially-available protocols, including without limitation TCP/IP, SNA, IPX, AppleTalk, and the like. Merely by way of example, the network 510 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 502, 504, 506 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 506) may be dedicated to running applications, such as a business application, a Web server, application server, etc. Such servers may be used to process requests from user computers 512, 514, 516, 518. The applications can also include any number of applications for controlling access to resources of the servers 502, 504, 506.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 512, 514, 516, 518. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 512, 514, 516, 518.

The system 500 may also include one or more databases 520. The database(s) 520 may reside in a variety of locations. By way of example, a database 520 may reside on a storage medium local to (and/or resident in) one or more of the computers 502, 504, 506, 512, 514, 516, 518. Alternatively, it may be remote from any or all of the computers 502, 504, 506, 512, 514, 516, 518, and/or in communication (e.g., via the network 510) with one or more of these. In a particular set of embodiments, the database 520 may reside in a storage-area network ("SAN") familiar to those skilled in the art. Similarly, any necessary files for performing the functions attributed to the computers 502, 504, 506, 512, 514, 516, 518 may be stored locally on the respective computer and/or remotely, as appropriate. In one set of embodiments, the database 520 may be a relational database, such as Oracle 10 g, that is adapted to store, update, and retrieve data in response to SQL-formatted commands.

Figure 6:
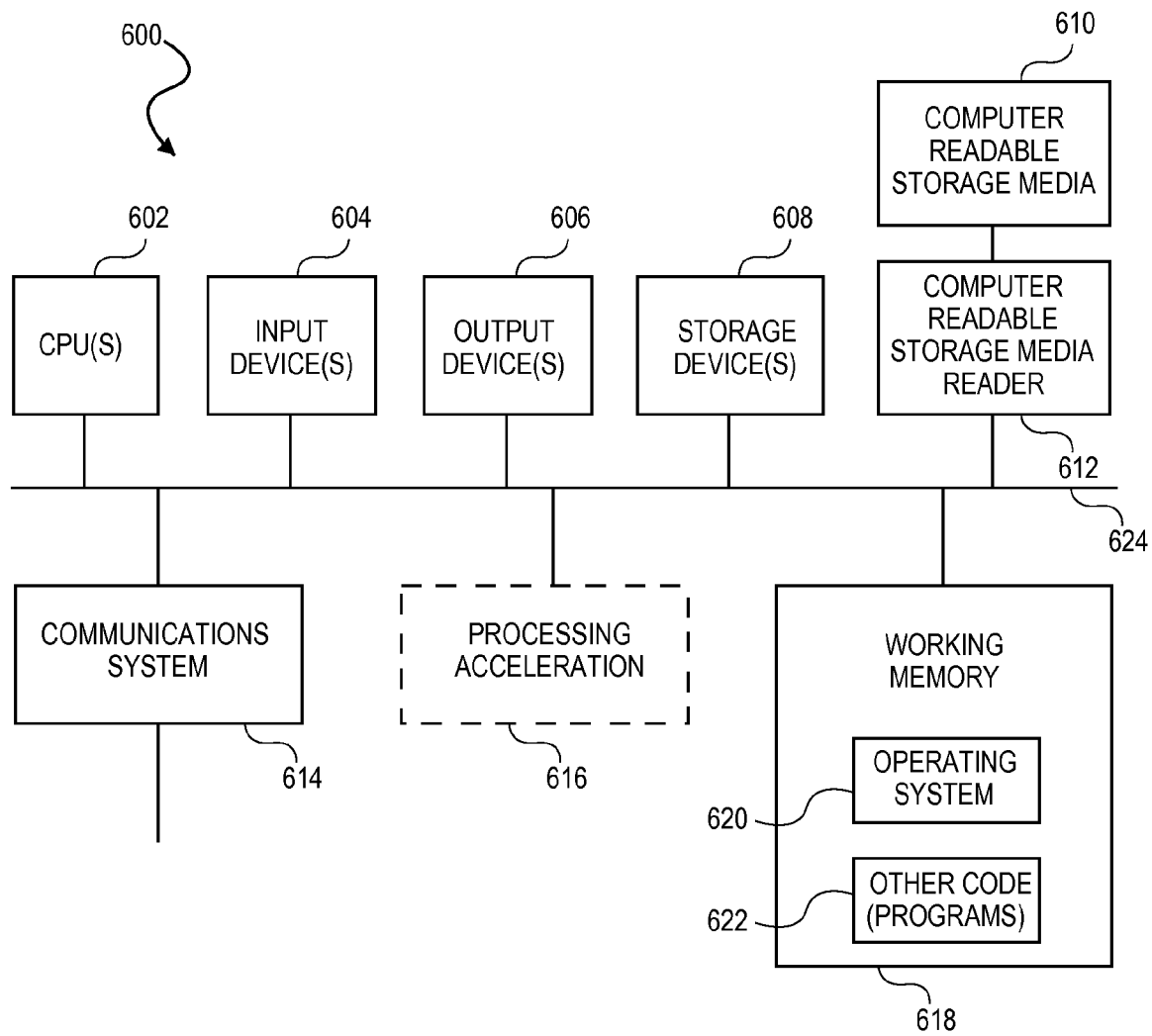
FIG. 6 illustrates components of a computerized device that can be used in accordance with one embodiment.

FIG. 6 illustrates an exemplary computer system 600, in which various embodiments of the present invention may be implemented. The system 600 may be used to implement any of the computer systems described above. The computer system 600 is shown comprising hardware elements that may be electrically coupled via a bus 624. The hardware elements may include one or more central processing units (CPUs) 602, one or more input devices 604 (e.g., a mouse, a keyboard, etc.), and one or more output devices 606 (e.g., a display device, a printer, etc.). The computer system 600 may also include one or more storage devices 608. By way of example, the storage device(s) 608 can include devices such as disk drives, optical storage devices, solid-state storage device such as a random access memory ("RAM") and/or a read-only memory ("ROM"), which can be programmable, flash-updateable and/or the like.

The computer system 600 may additionally include a computer-readable storage media reader 612, a communications system 614 (e.g., a modem, a network card (wireless or wired), an infra-red communication device, etc.), and working memory 618, which may include RAM and ROM devices as described above. In some embodiments, the computer system 600 may also include a processing acceleration unit 616, which can include a digital signal processor DSP, a special-purpose processor, and/or the like.

The computer-readable storage media reader 612 can further be connected to a computer-readable storage medium 610, together (and, optionally, in combination with storage device(s) 608) comprehensively representing remote, local, fixed, and/or removable storage devices plus storage media for temporarily and/or more permanently containing, storing, transmitting, and retrieving computer-readable information. The communications system 614 may permit data to be exchanged with the network and/or any other computer described above with respect to the system 600.

The computer system 600 may also comprise software elements, shown as being currently located within a working memory 618, including an operating system 620 and/or other code 622, such as an application program (which may be a client application, Web browser, mid-tier application, RDBMS, etc.). It should be appreciated that alternate embodiments of a computer system 600 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

What is claimed is:

1. A method of porting program code having at least two types of configuration repositories describing a single configuration of the program code, the method comprising:
    detecting a foreign key in a first configuration item in a first repository, the foreign key pointing to a second configuration item in a second repository, the first and second repositories being of different repository types;
    creating a logical reference using the foreign key, the logical reference being associated with the first configuration item and referencing an indeterminate configuration item of the same data type as the second configuration item;
    copying a portion of the first repository to an exportable format;
    reading the first configuration item in a deployed computer environment, the first configuration item comprising the foreign key;
    determining a third configuration item in a third repository by using the foreign key;
    reading a policy in the third configuration item in order to ascertain whether an attribute in the first configuration item can be changed;
    allowing the attribute to be changed based on the ascertainment; and
    storing the logical reference with the exportable format to enable resolving the foreign key in the first configuration item to the third configuration item in the third repository, the second and third repositories being of the same repository type.

2. The method of claim 1 further comprising adding code to the first repository, the code being associated with the first configuration item and comprising machine-readable instructions to resolve the foreign key.

3. The method of claim 2 further comprising:
    copying the portion of the first repository from the exportable format to a deployed environment;
    scanning the deployed environment for the third repository; and
    resolving the foreign key in the first configuration item by using the logical reference and processing the code so that the foreign key points to the third configuration item in the third repository.

4. The method of claim 1 wherein the foreign key further points to a field within the second configuration item to create a deep link.

5. The method of claim 1 further comprising:
    copying the portion of the first repository from the exportable format to a deployed environment;
    scanning the deployed environment for the third repository; and
    resolving the foreign key in the first configuration item by using the logical reference so that the foreign key points to the third configuration item in the third repository.

6. The method of claim 1 further comprising creating a map file suitable for a plurality of logical references and updating the map file with the logical reference.

7. The method of claim 1 wherein the second repository is an extensible markup language (XML) file, wherein the second configuration item comprises XML.

8. The method of claim 1 wherein the first configuration repository comprises a relational database.

9. The method of claim 1 further comprising introspecting the second configuration repository.

10. A method of deploying a software application having at least two disparate configuration repositories, wherein the software application is deployed from an initial computer environment to a deployed computer environment, the method comprising:
    detecting a foreign key in a first configuration item stored in a first repository for a software application in an initial environment that points to a second configuration item;
    creating a logical reference which points to the second configuration item in a second repository for the software application in the initial environment using the detected foreign key, the second repository being of a different type than the first repository;
    copying a portion of the first repository from the initial environment to a deployed environment;
    reading the first configuration item in the deployed computer environment, the first configuration item comprising the foreign key;
    determining a third configuration item in the second environment by using the foreign key;
    reading a policy in the third configuration item in order to ascertain whether an attribute in the first configuration item can be changed;
    allowing the attribute to be changed based on the ascertainment; and
    resolving the foreign key in the first configuration item using the logical reference so that the foreign key points to the third configuration item in a third repository in the deployed environment, the first and third repositories being of different repository types,
    wherein after foreign key is resolved, the portion of the first repository is operable to be used in the deployed environment, and the first and third repositories are associated with the software application which is deployed.

11. The method of claim 10 further comprising resolving a foreign key in the second configuration item such that the foreign key points to an item in the first repository to create a cross-link.

12. The method of claim 10 further comprising replacing the foreign key with the logical reference.

13. The method of claim 10 wherein the second and third repositories are of the same type.

14. The method of claim 10 wherein the second and third configuration items comprise different configuration data.

15. A machine-readable non-transitory storage medium embodying information indicative of instructions for causing one or more machines to perform operations for exporting to an exportable format a software application having two or more different types of configuration repositories describing a single configuration of the software application, the operations comprising:
    detecting a foreign key in a first configuration item in a first repository, the foreign key pointing to a second configuration item in a second repository, wherein the first and second repositories are of different repository types;
    creating a logical reference using the foreign key, the logical reference being associated with the first configuration item and referencing an indeterminate configuration item of the same data type as the second configuration item;

copying a portion of the first repository to an exportable format;

reading the first configuration item in a deployed computer environment, the first configuration item comprising the foreign key;

determining a third configuration item in a third repository by using the foreign key;

reading a policy in the third configuration item in order to ascertain whether an attribute in the first configuration item can be changed;

allowing the attribute to be changed based on the ascertainment; and storing the logical reference with the exportable format to enable resolving the foreign key in the first configuration item to the third configuration item in the third repository, the second and third repositories being of the same repository type.

* * * * *